July 9, 1968 G. WEISLEHNER 3,391,832
HOMOGENIZATION CHAMBER FOR GRANULAR MATERIALS
Filed Oct. 19, 1965 2 Sheets-Sheet 1
FIG./
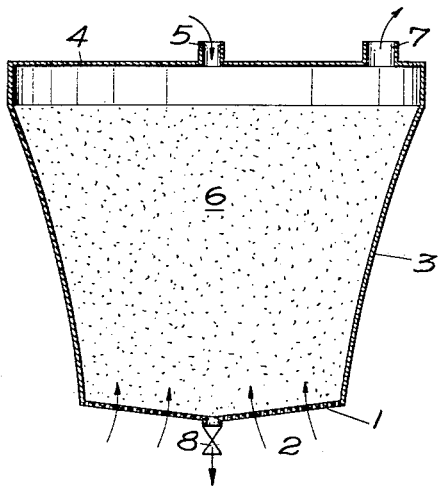
FIG.2
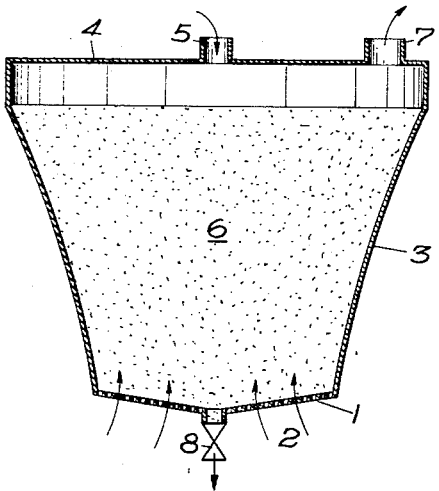
FIG.3
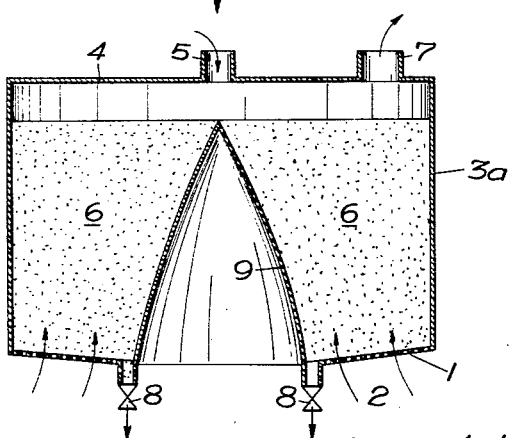
INVENTOR
GUSTAV WEISLEHNER,
BY
ATTORNEY July 9, 1968 G. WEISLEHNER 3,391,832
HOMOGENIZATION CHAMBER FOR GRANULAR MATERIALS
Filed Oct. 19, 1965 2 Sheets-Sheet 2
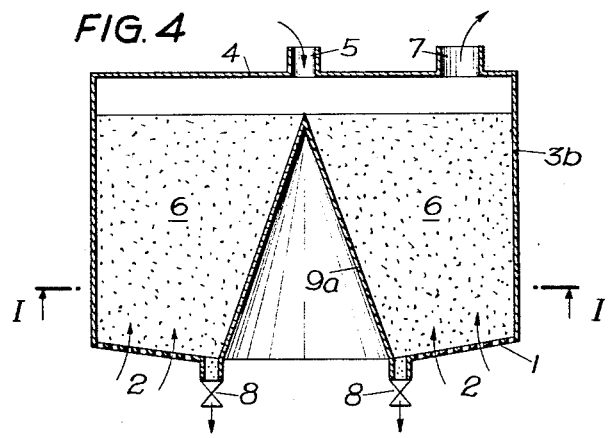
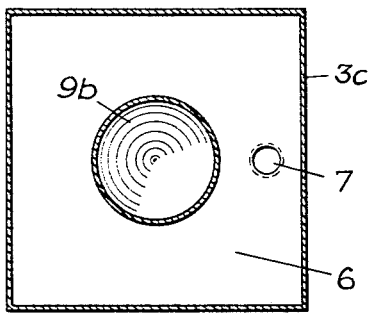
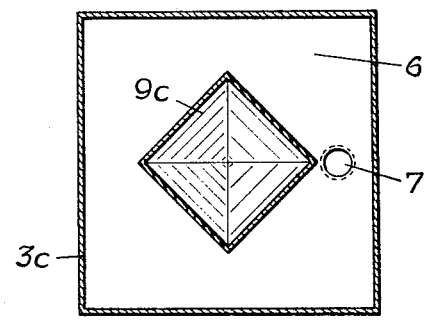
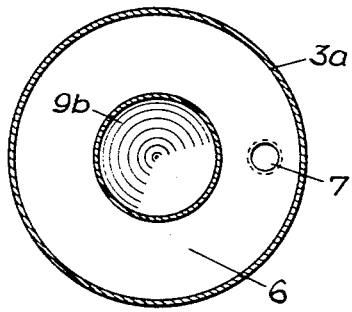
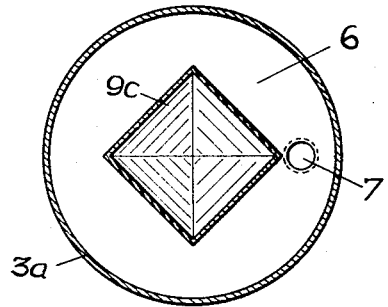
INVENTOR.
GUSTAV WEISLEHNER,
BY MELVILLE, STRASSER, FOSTER & HOFFMAN
ATTORNEYS

3,391,832
HOMOGENIZATION CHAMBER FOR GRANULAR MATERIAL

Gustav Weislehner, Pinsdorf, Upper Austria, Austria, assignor to Gmundner Portlandzementfabrik Hans Hatschek, Gmunden, Upper Austria, Austria, a firm
Filed Oct. 19, 1965, Ser. No. 497,878
Claims priority, application Austria, Aug. 27, 1965, 7,887/65
6 Claims. (Cl. 222—195)

The invention relates to a silo or homogenization chamber for mixing material ranging from powdered to fine-granular state, for instance powdered cement raw material or cement with a flowing medium, for instance air, being blown in through the bottom of the silo.

In increasing rate in cement plants working with the dry process the material prepared for calcination is suitably composed for the calcination process in so-called mixing silos before being fed to the cylindrical rotary furnace. In the same way the end product—cement of different classes and quality—is treated increasingly by pneumatic mixing to balance the variations being often inevitable in manufacturing the product. The mixing operation is achieved by means of the fluidized bed which is already well known, this effect being obtained by blowing air or another flowing medium through porous plates at the bottom of the silo. According to the discharge conditions the bottom part of the silo is constructed in the form of a cone or a pyramid. The silo wall is cylindrical or prismatic and the amount of material to be mixed can be even over 1000 tons per charge.

In silos having the usual dimensions with a bottom surface being often larger than 100 sq. m. and with several meters height of bed a satisfactory mixing of the complete content of the silo can hardly be obtained, or larger quantities of flowing medium are necessary than required for the mixing process per se which in turn gives an undesired discharge of the material by means of the flowing medium. The material at the bottom of the silo is not so intensely mixed as the material in the upper layers. The reason therefor is that the compressibility of the flowing medium is no more negligible when the height of the layers of material to be mixed increases over about 2 meters.

It is the object of the invention to avoid the disadvantages of the known devices and to provide a silo being suitable for improving substantially the homogenization process carried out in those silos. According to the invention this is obtained by continuously increasing the cross-sectional area of the silo from the bottom towards the top of the silo throughout the normal or active fill height of the silo. In such a construction of a silo being suitable for industrial pneumatic mixing operations of material ranging from powdered to fine-granular state, for instance of powdered cement raw material or cement powder, a mixing movement which is uniform or increasing along the height of the material to be mixed will occur when a compressible flowing medium flows through the material and the homogenization process will be substantially improved without an undesired discharge of the treated material by means of the flowing medium.

The particular shape of the silo which can be due to the shape of the wall, due to suitable inserts or due to a combination thereof is determined by the particular properties of the material to be mixed and of the flowing material being used.

In the accompanying drawing embodiments of the invention are shown.

FIGS. 1 and 2 show sections of silos, the outer walls of which are diverging towards the top of the silo.

FIG. 3 shows a section of a silo with a conical insert.

The silo substantially consists of a porous, i.e. perforated tapered bottom part 1 through which mixing air 2 or another flowing medium is supplied and of the walls 3. Preferably the silo is covered by means of a cover 4, in which an inlet 5 is provided for the material 6. Furthermore, an outlet 7 for the used air is provided in the cover 4, through which outlet the mixing air 2 leaves the silo again after having passed through the material 6. A discharge valve 8 for the mixed final product 6 is provided in the bottom part 1.

As is to be seen from the drawing, the cross-sectional area of the silo continuously enlarges from the bottom 1 towards the top of the silo. For this purpose in FIGS. 1 and 2 the curved outer wall 3 of the silo is diverging towards the top of the silo. In the embodiment shown in FIG. 1 a uniform mixing movement is obtained along the height of the material to be mixed by keeping almost constant the degree of aeration over the entire height of the mixing bed. By tapering the outer wall of the silo to a greater extent than according to the theoretical measure as is shown in FIG. 2 it is also possible to obtain a higher degree of aeration at the bottom of the silo and thus to achieve a more intimate mixing operation of the complete content of the silo. As the silo walls 3 in accordance with the nature of the material to be mixed are more or less curved the silo walls can be composed approximately of one or more plane parts being adapted to the theoretical shape.

According to FIG. 3 the outer silo wall 3a is of cylindrical shape and a substantially conical core 9 is provided in the inside of the silo, the surface of the core being also curved. The desired increase of the cross-sectional area is thus obtained by a suitably shaped insert. In this embodiment two or more discharge valves 8 are arranged in the bottom 1. The insert or core 9 can be mounted centrally or excentrically. The shape of the core 9 depends on the desired mixing effect as illustrated already by way of example in FIGS. 1 and 2. The combination of both embodiments, viz. The conical wall 3, and conical insert and cores 9, respectively, is also possible for industrial purposes. As noted above, the core 9 may be other than conical in shape. The tapered insert or core 9 may be in the shape of a pyramid 9c or cone 9b (see FIGURES 4–8). FIGURE 4 is a front elevation in section showing the cone 9a with a continuous straight wall. FIGURES 5 and 7 are top views, with portions removed, showing the relationship of the cone 9b to the side walls 3c and 3a respectively. FIGURES 6 and 8 are top views, with the same portions removed, showing the relationship of a pyramidal core 9c to the side walls 3c and 3a respectively.

What I claim is:
1. A device for the homogenization of powdered and granular material consisting essentially of a chamber having wall surfaces defining a material receiving body, a bottom plate closing the lower end of said body, and a cover closing the upper end of said body, said bottom plate being inclined downwardly and inwardly toward its center, a valved discharge orifice in said bottom plate for discharging material from said chamber, perforations in said bottom plate for introducing a gaseous medium into said chamber, an inlet orifice in said cover for introducing material into said chamber, means at the upper end of said chamber for discharging the gaseous medium introduced into the bottom of said chamber through the perforations in said bottom plate, the wall surfaces of said chamber being tapered with respect to each other so that the body of said chamber is of progressively greater cross sectional area from bottom to top throughout its active fill height.

2. The homogenization chamber claimed in claim 1 wherein the wall surfaces of said chamber consist of an annular outer wall which curves outwardly from bottom to top in vertical cross section.

3. The homogenization chamber claimed in claim 1 wherein said wall surfaces consist of an outer cylindrical wall and an inner centrally disposed wall surface defining a core which is of conical configuration and has its base end seated on said bottom plate, said core projecting upwardly within said chamber throughout the active fill height thereof.

4. The homogenization chamber claimed in claim 1 wherein said wall surfaces consist of an outer cylindrical wall and an inner centrally disposed wall surface defining a core which is of pyramidal configuration and has its base end seated on said bottom plate, said core projecting upwardly within said chamber throughout the active fill height thereof.

5. The homogenization chamber claimed in claim 1 wherein said wall surfaces consist of an outer peripheral wall which is rectangular in horizontal cross section and has vertically disposed wall surfaces, and an inner centrally disposed wall surface defining a core which is of conical configuration and has its base end seated on said bottom plate, said core projecting upwardly within said chamber throughout the active fill height thereof.

6. The homogenization chamber claimed in claim 1 wherein said wall surfaces consist of an outer peripheral wall which is rectangular in horizontal cross section and has vertically disposed wall surfaces, and an inner centrally disposed wall surface defining a core which is of pyramidal configuration and has its base end seated on said bottom plate, said core projecting upwardly within said chamber throughout the active fill height thereof.

References Cited
UNITED STATES PATENTS

| | | | |
|---|---|---|---|
| 2,359,029 | 9/1944 | Goldberg | 222—195 |
| 2,613,854 | 10/1952 | Sylvest et al. | 222—195 |
| 2,668,085 | 2/1954 | Baresch | 222—193 |
| 3,053,420 | 9/1962 | Saint-Martin | 222—195 |
| 3,081,009 | 3/1963 | Cooper | 222—564 |

STANLEY H. TOLLBERG, *Primary Examiner.*